United States Patent
Benhase et al.

(10) Patent No.: US 7,562,284 B2
(45) Date of Patent: Jul. 14, 2009

(54) APPARATUS, SYSTEM, AND METHOD FOR MANDATORY END TO END INTEGRITY CHECKING IN A STORAGE SYSTEM

(75) Inventors: Michael Thomas Benhase, Tucson, AZ (US); Michael John Palmer, Southampton (GB); William Garrett Verdoorn, Jr., Rochester, MN (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/212,208

(22) Filed: Aug. 26, 2005

(65) Prior Publication Data

US 2007/0050542 A1 Mar. 1, 2007

(51) Int. Cl.
*H03M 13/00* (2006.01)
(52) U.S. Cl. .................... 714/799; 714/52; 714/758; 714/781
(58) Field of Classification Search ................ 714/52, 714/758, 781, 799
See application file for complete search history.

(56) References Cited

U.S. PATENT DOCUMENTS

| | | | |
|---|---|---|---|
| 5,321,704 A | 6/1994 | Erickson et al. ............ 371/37.1 |
| 5,640,506 A * | 6/1997 | Duffy ............................ 714/6 |
| 7,120,850 B2 * | 10/2006 | Lehobey et al. ............. 714/755 |
| 7,343,540 B2 * | 3/2008 | Khermosh et al. .......... 714/758 |
| 7,356,756 B1 * | 4/2008 | Chan et al. .................. 714/781 |
| 2003/0177435 A1 | 9/2003 | Budd et al. ................. 714/776 |

FOREIGN PATENT DOCUMENTS

CN 178933 A 1/2001

OTHER PUBLICATIONS

Robert Jardine, "Fault-Tolerant Systems from Commodity Off-The-Shelf Components?", Compaq, Tandem Division, FTCS-29, Jun. 1999, pp. 1-16.

* cited by examiner

*Primary Examiner*—Esaw T Abraham
(74) *Attorney, Agent, or Firm*—Kunzler & McKenzie (57) ABSTRACT

An apparatus, system, and method are disclosed for mandatory end to end integrity checking. The apparatus includes a compatibility module configured to monitor data from a source and verify integrity information compatibility with a standard, and an integrity module configured to wrap the data from the source with additional integrity information. The system includes a source configured to send data over a network, a target configured to receive data over the network, the apparatus, a main memory module, a storage controller, and a storage device. The method includes monitoring data from a source, verifying integrity information compatibility with a standard, and wrapping the data from the source with additional integrity information.

30 Claims, 6 Drawing Sheets

APPARATUS, SYSTEM, AND METHOD FOR MANDATORY END TO END INTEGRITY CHECKING IN A STORAGE SYSTEM

BACKGROUND OF THE INVENTION

1. Field of the Invention

This invention relates to data error checking and recovery and more particularly relates to data error checking and recovery in a data storage device in a Small Computer System Interface ("SCSI") End-to-End Checking system.

2. Description of the Related Art

The explosion of information created by e-business is making storage a strategic investment priority for companies of all sizes. The nature of e-business requires storage that supports data availability so that employees, customers and trading partners can access the data at any time during any day through reliable, disaster-tolerant systems. In the event of a disaster, high data availability and recovery are essential to maintaining business continuity.

In order to prevent data loss during a disaster, such as a system failure or natural disaster, many companies rely on storage backups. A backup of data may be stored on removable media, such as tapes or writable optical disks. While removable media may be suitable for small companies, large corporations require immense amounts of storage capacity and therefore removable media is not a viable option for data backup. One solution for large corporations is storage servers. Storage servers are typically located on a common business network and configured to share data with nodes on the network. One such implementation is a storage area network (SAN). A SAN is a high-speed subnetwork of shared storage devices. A storage device is a machine that contains a disk or disks for storing data. Additionally, storage servers may be located remotely in order to provide data redundancy in the event of a complete site failure.

For current storage area networks, data is typically transmitted in a SCSI environment that does not provide redundancy checking from a source to a target. Currently, individual devices have internal error checking. For example, a PCI bus may have a parity bit added to each 32 bit word. The parity is tracked from where data is sent to the target along the bus, but once the data reaches the target device, the parity information is not retained. In recognition of this problem, a new SCSI standard is emerging called the SCSI T10 End-to-End Data Protection Standard which addresses the problem of errors introduced somewhere in the data stream between a source and a target that may not be detected by individual devices between the source, target, and storage device.

One element of the standard is to include information along with each sector of the data in the form of a 2-byte guard, a 2-byte application tag, and a 4-byte reference tag. This allows a redundancy check to be created and stored in the guard. The application tag is used by an application and the reference tag is part of the logical block address. Since the redundancy check can now be done at the source and transmitted to the target and stored on disk, it can be used to ensure data consistency from end to end.

However, according to the End-to-End Data Protection standard, the host or source can add any information it desires in those integrity fields and require that the target device or data storage server return them verbatim. In this mode, intermediate devices are not allowed to check the integrity of the payload, only pass the data. If an error is seen, recovery is difficult or impossible. Additionally, determining the source of the error becomes very difficult. The End-to-End Data Protection standard allows this behavior because in certain environments the application that sends the data may use the guard for a purpose other than integrity checking, and the application must have the information returned exactly as it was sent.

Since the foremost responsibility of a storage system is to store and return the data with integrity, allowing the source to disable end-to-end checking imposes a great risk of data loss. From the foregoing discussion, it should be apparent that a need exists for an apparatus, system, and method for mandatory end-to-end data protection that overcome the redundancy check problem associated with source being allowed to disable end-to-end checking. Beneficially, such an apparatus, system, and method would allow data error checking and recovery in a SCSI environment while still complying with the End-to-End Data Protection standard.

SUMMARY OF THE INVENTION

The present invention has been developed in response to the present state of the art, and in particular, in response to the problems and needs in the art that have not yet been fully solved by currently available checking systems. Accordingly, the present invention has been developed to provide an apparatus, system, and method for mandatory end to end integrity checking in a storage system that overcomes many or all of the above -discussed shortcomings in the art.

The apparatus for end to end mandatory integrity checking is provided with a logic unit containing a plurality of modules configured to functionally execute the necessary steps of integrity checking. These modules in the described embodiments include a compatibility module configured to monitor data from a source. The compatibility module may also be configured to verify integrity information compatibility with a standard. The apparatus also includes an integrity module configured to wrap or add the data from the source with additional integrity information.

In one embodiment, the data having integrity information is sent in a Small Computer System Interface (SCSI) environment, and the standard may comprise a SCSI end to end data protection standard defined by the Technical Committee of the InterNational Committee on Information Technology Standards (INCITS). In a further embodiment, the additional integrity information comprises an 8 byte block of data having a Longitudinal Redundancy Check (LRC) portion, a sequence number portion, and a pad portion.

The apparatus of claim 1, wherein the integrity module is further configured to move the integrity information of the data to a header position, and attach the additional integrity information to the data. The data may comprise a 512 byte payload and integrity information comprising an 8 byte portion. The 8 byte portion includes a reference tag portion, an application tag portion, and a block guard portion. In one embodiment, the source is further configured to require a target to not check the integrity information.

In a further embodiment, the compatibility module is configured to recognize when the source requires the target to not check the integrity information, and further configured to notify the integrity module when the source requires the target to not check the integrity information. Additionally, the integrity module is configured to wrap the data with additional integrity information when the source has required the target to not check the integrity information.

Also, the integrity module may be configured to remove the additional integrity information prior to sending the data to one of the source or a host. In one embodiment, the apparatus includes a communication adapter having the compatibility module and integrity module and configured to receive data from the source and check integrity information of the data. The apparatus may also include a main memory module having the compatibility module and integrity module and configured to maintain a plurality of data blocks and check the integrity information of the data blocks.

In one embodiment, the apparatus further comprises a storage controller and a storage device, each having the compatibility module and integrity module and configured to check the integrity information of the data.

A system of the present invention is also presented for mandatory end to end integrity checking. In particular, the system, in one embodiment, includes a source configured to send data over a network, a target configured to receive data over the network, and the apparatus. The system may also include the main memory module, the storage controller, and the storage device.

A method of the present invention is also presented for mandatory end to end integrity checking. The method in the disclosed embodiments substantially includes the steps necessary to carry out the functions presented above with respect to the operation of the described apparatus and system. In one embodiment, the method includes monitoring data from a source, the source configured to send data having integrity information, verifying integrity information compatibility with a standard, and wrapping the data from the source with additional integrity information.

The method may also include moving the integrity information of the data to a header position, and to attach the additional integrity information to the data. Alternatively, the integrity information is not moved, and additional integrity information is attached or appended to the data. In a further embodiment, the method includes recognizing when the source requires the target to not check the integrity information, and notifying an integrity module when the source requires the target to not check the integrity information. Additionally, the method comprises wrapping the data with additional integrity information when the source has required the target to not check the integrity information.

In one embodiment, the method includes removing the additional integrity information prior to sending the data to one of the source or a host. Furthermore, the method also comprises checking integrity information of the data, and maintaining a plurality of data blocks and check the integrity information of the data blocks.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
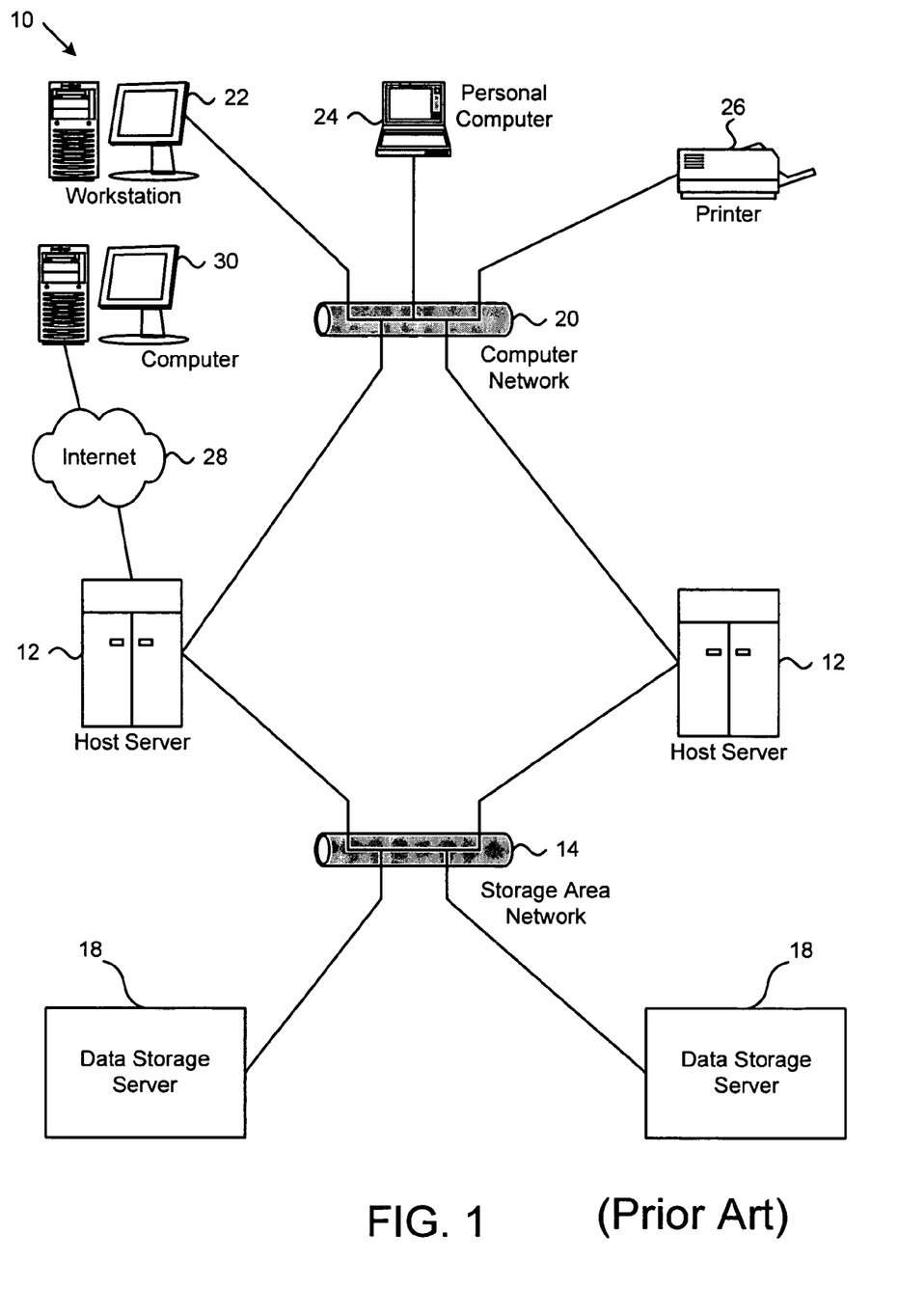
FIG. 1 is a schematic block diagram illustrating one embodiment of a system for data error checking and recovery in a SCSI End-to-End Data Protection standard environment in accordance with the prior art.

FIG. 1 depicts a system 10 for data error checking and recovery in a SCSI End-to-End Data Protection standard environment that overcomes the problems and limitations of the prior art. The system 10 includes one or more host servers 12 connected to a storage area network 14. A data storage server 18 is also connected to the storage area network 14. The data storage server 18 may alternatively be a RAID data storage server or any other data storage device where the error checking standard causes an inability to enforce end to end checking similar to the problem described above in the Background of the Invention section. The system 10 may also include one or more data storage servers 18.

The system 10 also may include a computer network 20. One or more workstations 22, personal computers 24, printers 26, or other devices may be connected to the computer network 20. In addition, a host server 12 may have an Internet connection 28 with other computers 30 connected to the Internet connection 28. One skilled in the art will recognize other storage area network, computer network, and Internet configurations including other data storage devices, computers, workstations, mainframe computers, personal computers, printers, and other peripherals that relevant to the present system 10.

Figure 2:
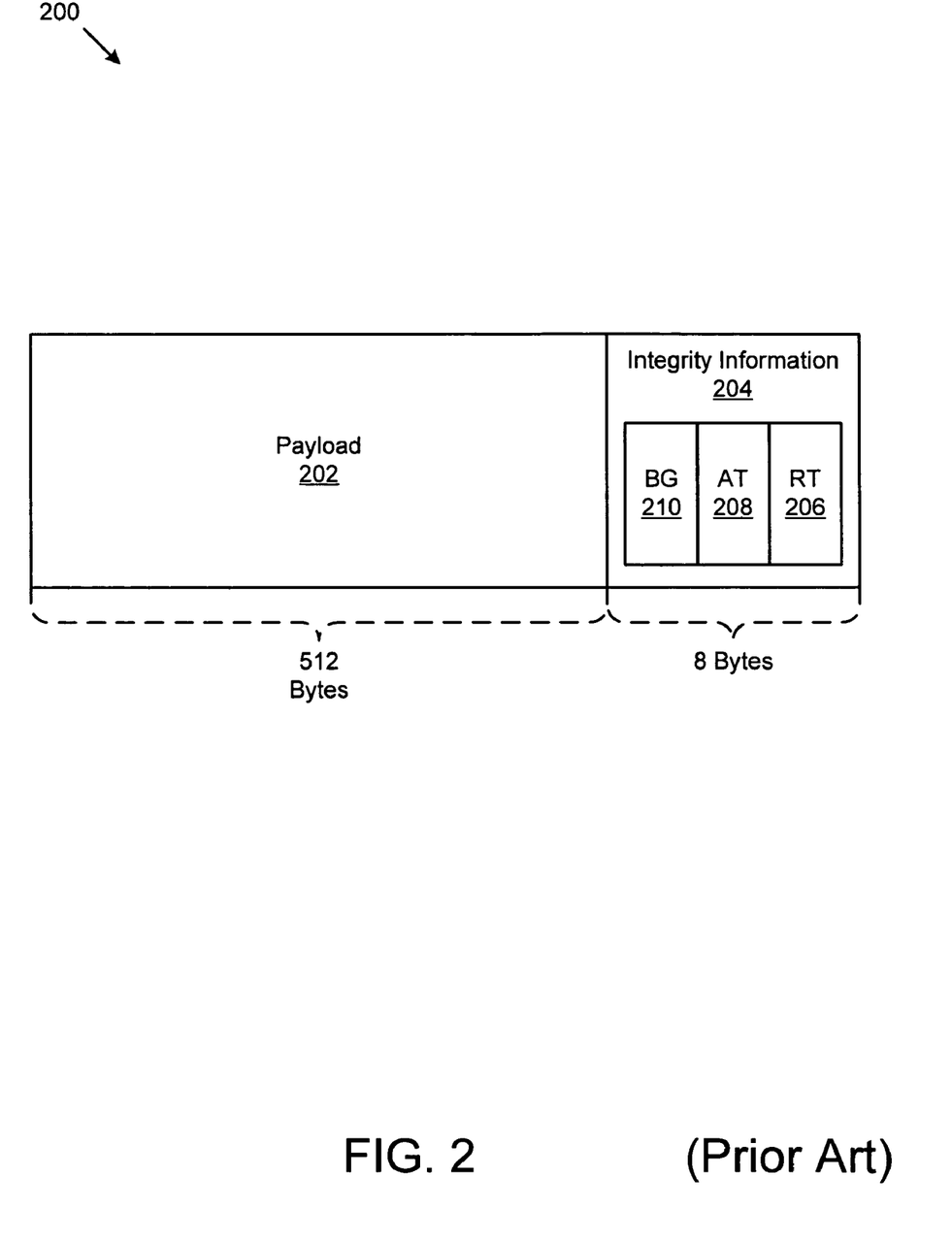
FIG. 2 is a schematic block diagram illustrating one embodiment of a block of data in accordance with the prior art.

FIG. 2 is a schematic block diagram illustrating one embodiment of a block of data 200 in accordance with the prior art. In one embodiment, the block of data 200 includes a payload 202 and integrity information 204. The payload 202 comprises data other than headers and control information. In a further embodiment, the payload 202 has a size of 512 bytes, in accordance with a SCSI standard. Alternatively, the payload 202 may have a size of up to 2112 bytes.

The integrity information 204 may include a reference tag (RT) 206, an application tag (AT) 208, and a block guard (BG) 210. The reference tag 206 field is set to the least significant four bytes of a logical block address of the storage server 18 to which the data block is associated. The application tag 208 is typically set by an application, and are not defined by the SCSI End-to-End Data Protection standard. The block guard 210 contains a cyclical redundancy check (CRC) of the payload 202. A CRC is a type of check value designed to catch most transmission errors. A decoder (not shown) calculates the CRC for the received data and compares it to the CRC that an encoder calculated, which is appended to the data. A mismatch indicates that the data was corrupted in transit. Integrity information 204 is well known to those skilled in the art of SCSI architecture, and therefore further discussion will not be given.

Figure 3:
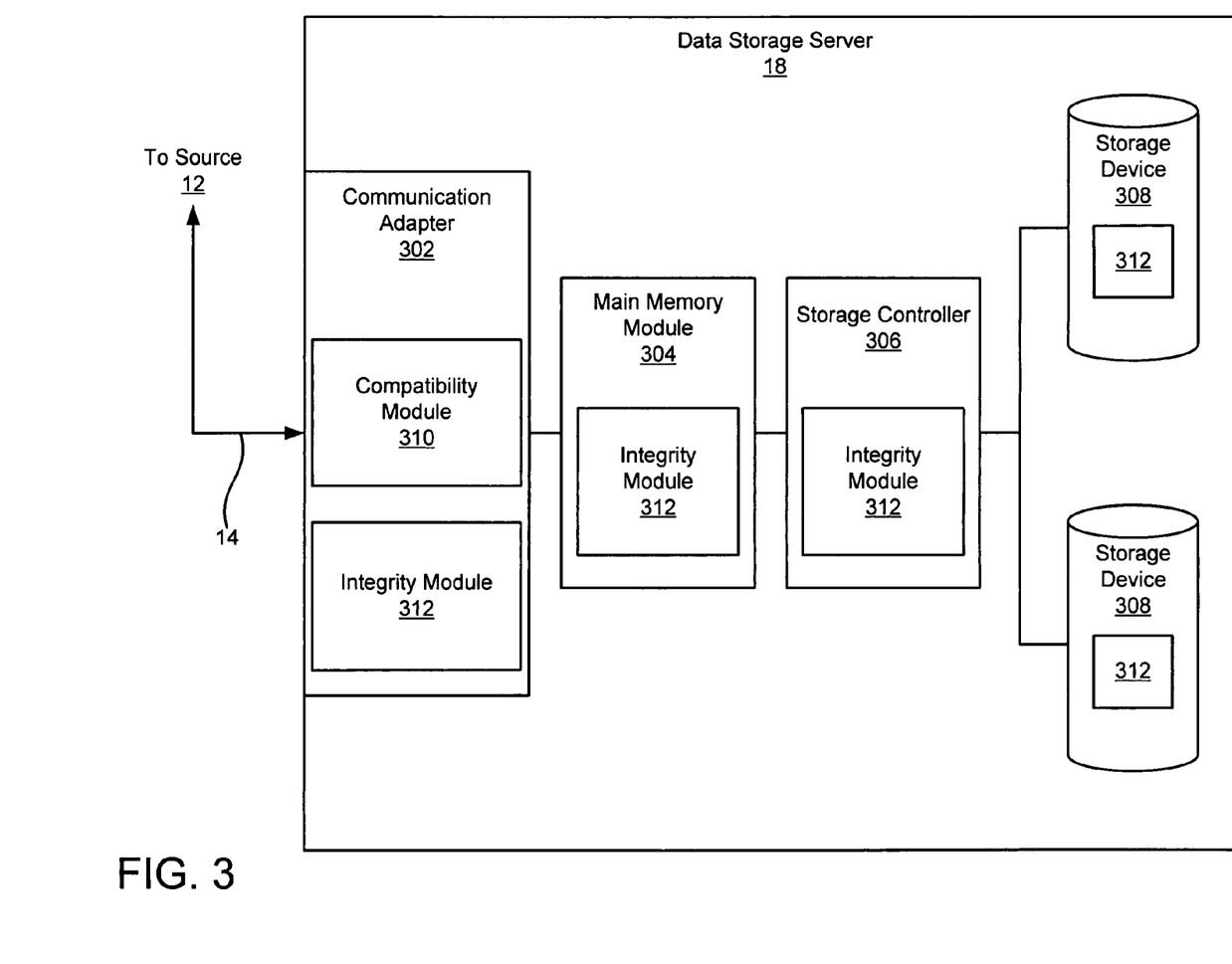
FIG. 3 is a schematic block diagram illustrating one embodiment of a data storage server in accordance with the present invention.

FIG. 3 is a schematic block diagram illustrating one embodiment of the data storage server 18 in accordance with the present invention. The data storage server 18, as described above with reference to FIG. 1, may be coupled to the host 12 or a source over the storage area network 14. In one embodiment, the data storage server 18 (hereinafter "server") comprises a communication adapter 302, a main memory module 304, a storage controller 306, and a plurality of storage devices 308. In the depicted embodiment, the communication adapter 302, the main memory module 304, the storage controller 306, and the storage devices 308 may be centrally located within the server 18. Alternatively, each component 302, 304, 306, 308 may be distributed over a communications network. Furthermore, the server 18 may comprise a plurality of communication adapters 302.

The communication adapter 302 may be configured to communicate over a variety of networks, such as, but not limited to the storage area network 14, a local area network, a wide area network, the Internet, etc. The storage area network 14 may be implemented over other protocols, such as, Infiniband FICON, TCP/IP, Ethernet, Gigabit Ethernet, or iSCSI.

In one embodiment, the communication adapter 302 comprises a compatibility module 310 and an integrity module 312. The compatibility module 310 may be configured to monitor data from the source 12 and verify integrity information compatibility with a standard. Alternatively, the functions performed by the compatibility module 310 may be performed by the integrity module 312. Standards are typically defined by a professional organization of members interested in the development of hardware, software, or communication protocols. In a further embodiment, the standard may be a SCSI End-to-End Data Protection standard defined by the Technical Committee of the InterNational Committee on Information Technology Standards (INCITS).

According to the End-to-End Data Protection standard, the host or source 12 can add integrity information 204 to the payload 202 and require that the server 18 does not modify the integrity information 204. Intermediate devices are not allowed to check the integrity of the payload 202, only pass the data. If an error is seen, recovery is difficult or impossible. Additionally, determining the source of the error becomes very difficult, and the storage server 18 has no way to provide a check as data is transferred from module to module.

Advantageously, the compatibility module 310 may be configured to recognize that the host or source (hereinafter "source") 12 has required the server 18 to not check or modify the integrity information 204, and wrap the block of data 200 with additional integrity information. Wrapping the block of data 200 with additional integrity information allows the integrity module 312 to check the data while complying with the requirement from the source 12 to not check or modify the original integrity information 204. The additional integrity information may comply with the End-to-End Data Protection standard and may be in the form of BG, AT, and RT. As used herein, the term "wrap" refers to adding or appending to the original block of data 200.

In one embodiment, the compatibility module 310 is configured to initialize the additional integrity information and pass the block of data 200 together with the additional integrity information to the integrity module 312. In a further embodiment, the integrity module 312 is configured to analyze the block of data 200 and generate an integrity code to replace the initialized additional integrity information. The integrity code may be a longitudinal or circular redundancy check generated by a polynomial equation. Such integrity or error codes are well known to those skilled in the art.

The main memory module 304, often referred to as "cache," may also include the integrity module 312. Additionally, the storage controller 306 and each storage device 308 may include the integrity module 312. This, beneficially, enables the server 18 to pinpoint where an error occurs. For example, the integrity module 312 of the communication adapter 302 generates an integrity or error code. If the integrity module 312 of the main memory module 304 detects that a newly generated integrity code does not match the integrity code generated in the communication adapter 302, the server 18 knows that an error is occurring between the communication adapter 302 and the main memory module 304.

Figure 4:
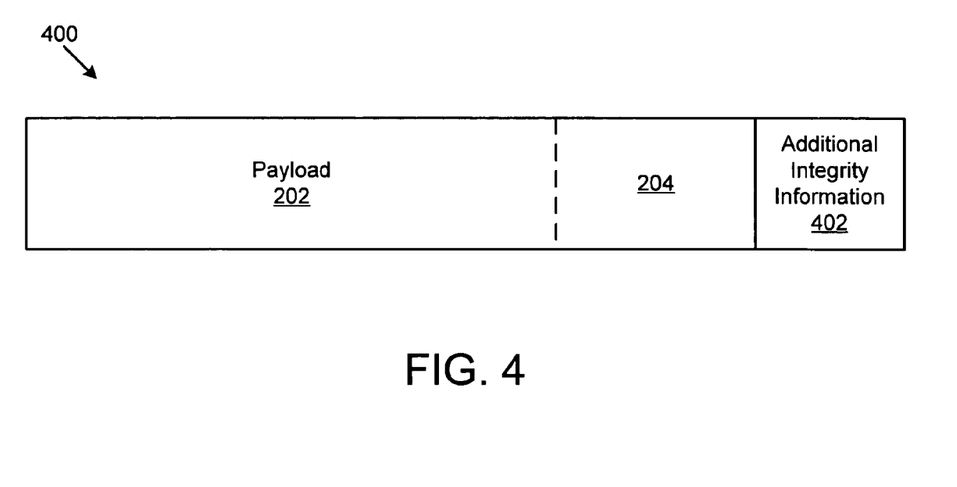
FIG. 4 is a schematic block diagram illustrating one embodiment of a block of data in accordance with the present invention.

FIG. 4 is a schematic block diagram illustrating one embodiment of a block of data 400 in accordance with the present invention. In one embodiment, the block of data 400 comprises the additional integrity information 402. As described above, the compatibility module 310 is configured to move the original integrity information 204 to a header position and treat the original integrity information 204 as part of the payload 202 (as illustrated by the dashed numbering). Furthermore, the compatibility module 310 may be configured to wrap or append the additional integrity information 402 to the payload 202 and the original integrity information 204.

In a further embodiment, the compatibility module 310 is configured to initialize the additional integrity information 402. Initializing the additional integrity information 402 may comprise generating 8 bytes of zero. The integrity module 312 is configured to calculate or generate the integrity code based on the entire block of data 400, including the original integrity information 204. In one embodiment, the host 12 may not support any kind of integrity checking, and therefore the data arrives without integrity information 204. In this case, the compatibility module 310 may generate 8 bytes of zeroes to be used as the original integrity information.

Figure 5:
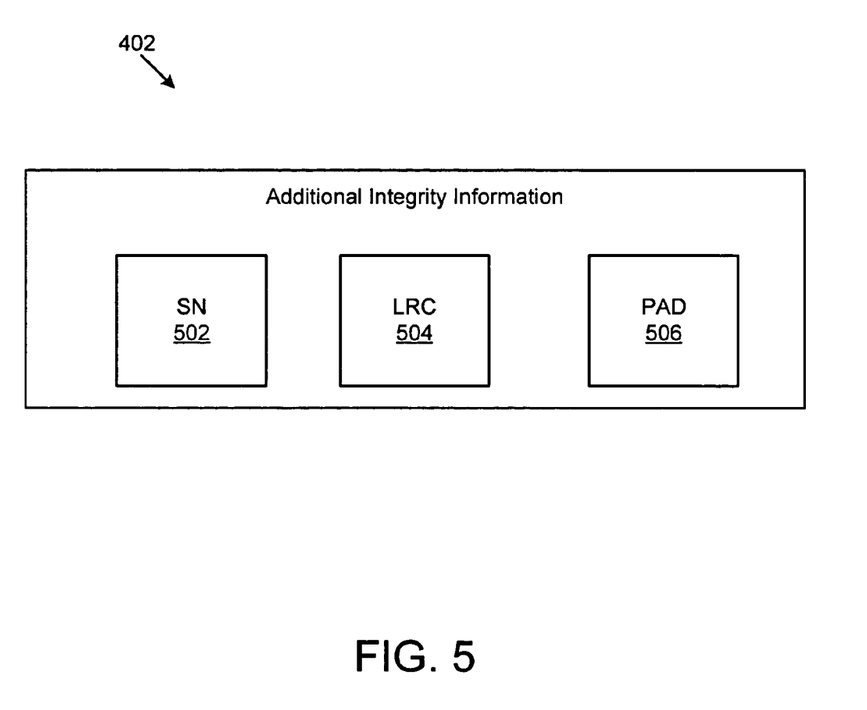
FIG. 5 is a schematic block diagram illustrating an alternative embodiment of additional integrity information in accordance with the present invention.

FIG. 5 is a schematic block diagram illustrating an alternative embodiment of the additional integrity information 402 in accordance with the present invention. In one embodiment, the additional integrity information 402 may include multiple portions conforming to common SCSI standards. For example, the additional integrity information may include a sequence number 502 portion, a longitudinal redundancy check (LRC) 504 portion, and a pad portion 506. Together, the multiple portion 502, 504, 506 may require 8 bytes. Alternatively, the additional integrity information 402 may comprise proprietary or server 18 dependent information that does or does not comply with the SCSI End-to-End Data Protection standard.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
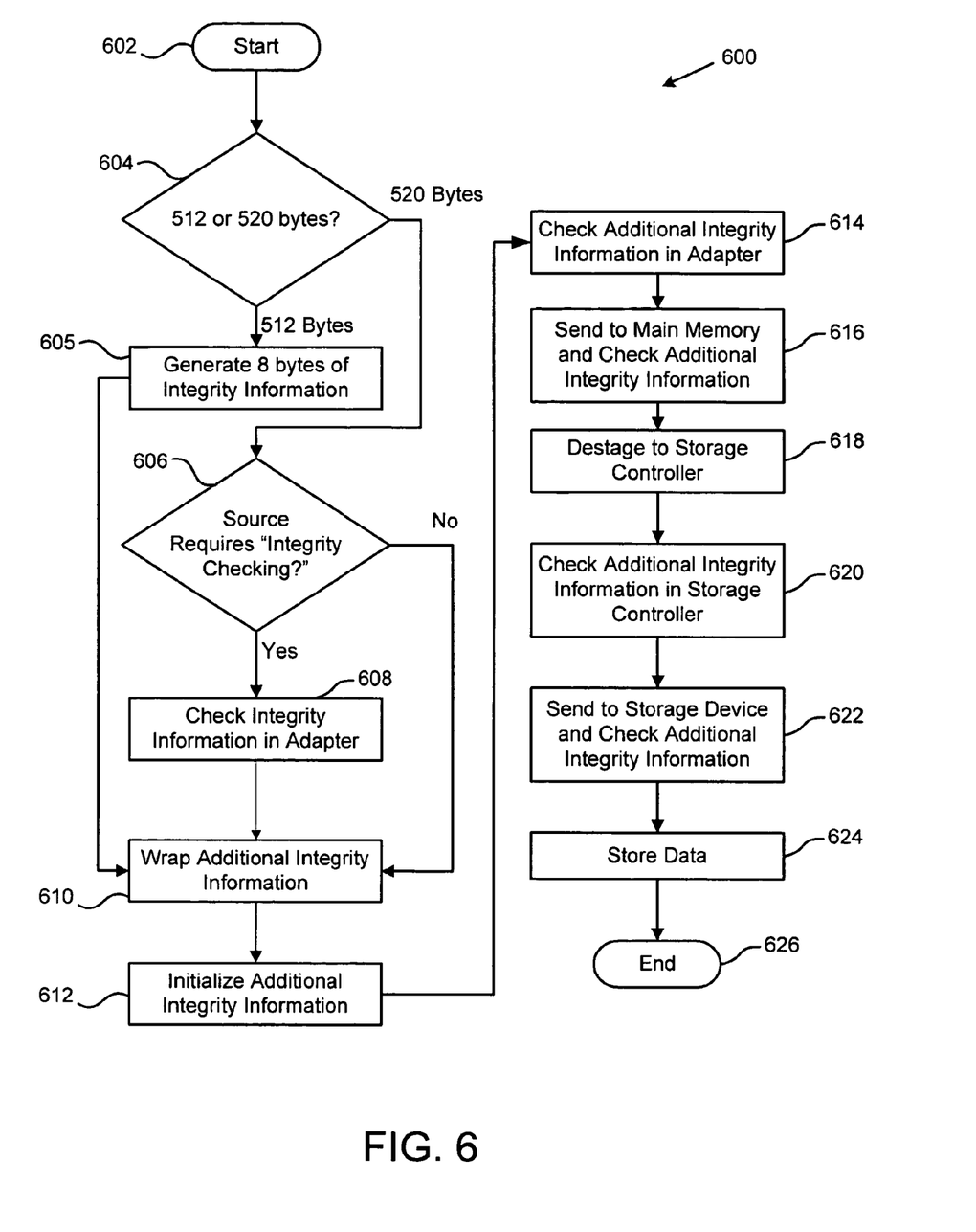
FIG. 6 is a schematic flow chart diagram illustrating one embodiment of a method for mandatory end-to-end data protection in accordance with the present invention.

FIG. 6 is a schematic flow chart diagram illustrating one embodiment of a method 600 for mandatory end-to-end data protection in accordance with the present invention. In one embodiment, the method 600 starts 602 and the compatibility module 310 monitors data being sent by the source 12. The compatibility module 310 monitors the data in order to verify compatibility with a standard. In one embodiment, the standard comprises the SCSI End-to-End Data Protection standard.

If the data complies 604 and contains 520 bytes, then the compatibility module 310 checks 606 for required integrity checking. The source 12, in compliance with the SCSI End-to-End Data Protection standard, may require 606 that the server 18 does not check or modify the integrity information 204. For example, the source 12 may implement proprietary information for use in an application in place of the integrity information 204, and therefore not want the server 18 or other intermediate devices to modify the integrity information 204. However, the compatibility module 310 enables integrity checking by wrapping 610 additional integrity information 402 around the payload 202 and the integrity information 204.

If the source requires 606 integrity checking then the integrity module 312 of the communication adapter checks 608 the integrity information before passing the data to the compatibility module 310 for wrapping 610 with additional integrity information. If the source requires 606 that the integrity information is not checked, then the integrity module 312 passes the data to the compatibility module 310 for wrapping 610 with additional integrity information.

If the data does not comply 604, and contains 512 bytes, then the compatibility module generates 605 8 bytes of integrity information in order to comply with the standard. The compatibility module 310 then wraps 610 the data with additional integrity information. The compatibility module, in one embodiment, may then initialize 612 the additional integrity information 402 by filling the 8 bytes of additional integrity information 402 with zeroes. The 8 bytes of additional integrity information 402 comply with the SCSI End-to-End Data Protection standard. Alternatively, the additional integrity information 402 may be proprietary, of any size, and need not comply with the standard. In a further embodiment, the integrity module 312 may then generate an integrity code by calculating a CRC or LRC based on both the payload 202 and the integrity information 204. Alternatively, the integrity module may implement a proprietary error checking algorithm for calculating the integrity code.

The integrity module 312 of the communication adapter checks 614 the block of data 400 before transferring 616 the block of data 400 to the main memory module 304 where the integrity module 312 of the main memory module 304 checks the data. The main memory module 304 then maintains the block of data 400 until destaging 618 to the storage devices 308. Destaging 618 is well known to those skilled in the art of storage area networks and will not be discussed further herein.

Once destaged 618, the integrity module 312 of the storage controller 306 checks 620 the block of data 400 by similarly calculating or generating a new integrity code and comparing the integrity code to the additional integrity information 402. If there is a discrepancy, the storage controller 306 may request that the main memory module 304 resends the block of data 400.

The storage controller 306 transfers 622 the data to the storage device, and the integrity module 312 of the storage device 308 checks the block of data 400 by calculating or generating a new integrity code and comparing the integrity code to the additional integrity information 402. The storage device 308 then stores 624 the block of data 400 and the method 600 ends 626.

Figure 7:
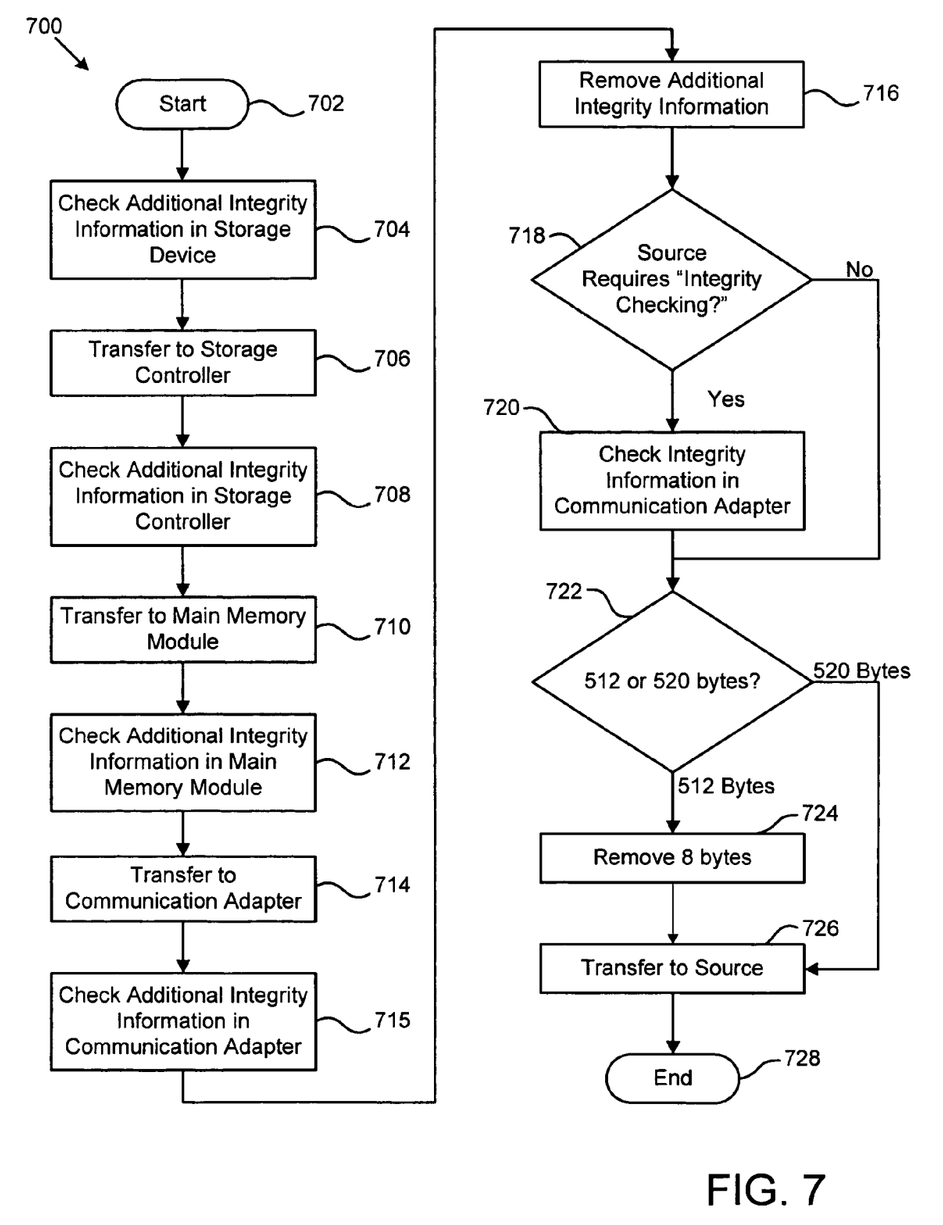
FIG. 7 is a schematic flow chart diagram illustrating an alternative embodiment of a method for mandatory end-to-end integrity checking in accordance with the present invention.

FIG. 7 is a schematic flow chart diagram illustrating an alternative embodiment of a method 700 for mandatory end-to-end integrity checking in accordance with the present invention. In one embodiment, the method 700 starts 702 and the integrity module 312 of the storage device 308 checks 704 the additional integrity information of block of data 400 before transferring 706 the block of data 400 to the storage controller 306. The storage controller 306 may then check 708 additional integrity information of the block of data 400. Checking 708 the block of data 400 may, in one embodiment, comprise calculating or generating an error code as described above with reference to FIG. 6.

The storage controller 306 may then transfer 710 the data block of data 400 to the main memory module 304 where the integrity module 312 checks 712 the additional integrity information of the block of data 400. The block of data 400 may reside in the main memory module 304 for long periods of time, and be sent to either the source 12 or returned to the storage device 308.

In the depicted embodiment, the main memory module 304 transfers 714 the block of data to the communication adapter 302 where the integrity module 312 may perform a final integrity check of the additional integrity information of block of data 400 prior to the block of data 400 leaving the server 18. In a further embodiment, the compatibility module 310 then removes 716 the additional integrity information 402. The integrity module 312 then checks 718 whether the source requires integrity checking. If yes, the integrity module checks 720 the integrity information in the communication adapter. The compatibility module 310 may then check 722 whether the source originally transferred 512 or 520 bytes.

If the original data was 512 bytes, then the compatibility module 310 removes the 8 byte integrity information and the communication adapter transfers 726 the data to the source. If the original data was 520 bytes, the communication adapter transfers 726 the 520 bytes of data to the source, and the method 700 ends 728.

In an alternative embodiment, if the source did not require 718 integrity checking, or required that the data not be checked, the compatibility module 310 checks 722 whether the source originally transferred 512 or 520 bytes and the method 700 continues as described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to check end to end integrity in a storage system, the apparatus comprising:
    a compatibility module configured to monitor data from a source, the data comprising integrity information, and the compatibility module configured to verify the compatibility of the integrity information with a standard;
    the compatibility module further configured to wrap the data from the source with additional integrity information, wherein the additional integrity information comprises a block of data having a Longitudinal Redundancy Check (LRC) portion, a sequence number portion, and a pad portion; and
    an integrity module configured to check the additional integrity information to verify the integrity of the data.

2. The apparatus of claim 1, wherein the data having integrity information is sent in a storage area network environment.

3. The apparatus of claim 1, wherein the block of data of the additional integrity information comprises an 8 byte block of data.

4. The apparatus of claim 1, wherein the compatibility module is further configured to move the integrity information of the data to a header position, and attach the additional integrity information to the data.

5. The apparatus of claim 1, wherein the data comprises a 512 byte payload and integrity information comprising an 8 byte portion having a reference tag portion, an application tag portion, and a block guard portion.

6. The apparatus of claim 1, wherein the source is further configured to require a target to not check the integrity information under certain circumstances.

7. The apparatus of claim 1, wherein the compatibility module is configured to wrap the data with additional integrity information when the source has required the target to not check the integrity information.

8. The apparatus of claim 1, wherein the compatibility module is further configured to remove the additional integrity information prior to sending the data to a host who does not support the standard.

9. The apparatus of claim 1, further comprising a communication adapter having the compatibility module and integrity module and configured to receive data from the source and check integrity information of the data.

10. The apparatus of claim 1, further comprising a main memory module having the compatibility module and integrity module and configured to maintain a plurality of data blocks and check the integrity information of the data blocks.

11. The apparatus of claim 1, further comprising a storage controller having the compatibility module and integrity module and configured to check the integrity information of the data.

12. The apparatus of claim 1, further comprising a storage device having the compatibility module and integrity module and configured to maintain a plurality of data blocks and check the integrity information of the data blocks.

13. A system to enforce mandatory end to end integrity checking in a storage system, the system comprising:
    a source configured to send data over a network, the data comprising integrity information;
    a target configured to receive data over the network;
    a compatibility module configured to monitor data from the source and verify the compatibility of the integrity information with a standard;
    the compatibility module further configured to wrap the data from the source with additional integrity information, wherein the additional integrity information comprises a block of data having a Longitudinal Redundancy Check (LRC) portion, a sequence number portion, and a pad portion;

an integrity module configured to check the additional integrity information to verify the integrity of the data;

a communication adapter having the compatibility module and integrity module and configured to receive data from the source and check integrity information of the data;

a main memory module having the integrity module and configured to maintain a plurality of data blocks and check the integrity information of the data blocks;

a storage controller having the integrity module and configured to check the integrity information of the data; and a storage device having the integrity module and configured to maintain a plurality of data blocks and check the integrity information of the data blocks.

14. The system of claim 13, wherein the data having integrity information is sent in a storage area network environment.

15. The system of claim 13, wherein the block of data of the additional integrity information comprises an 8 byte block of data.

16. The system of claim 13, wherein the compatibility module is further configured to move the integrity information of the data to a header position, and append the additional integrity information.

17. The system of claim 13, wherein the data comprises a 512 byte payload and integrity information comprising an 8 byte portion having a reference tag portion, an application tag portion, and a block guard portion.

18. The system of claim 13, wherein the source is further configured to require a target to not check the integrity information.

19. The system of claim 13, wherein the integrity module is configured to wrap the data with additional integrity information when the source has required the target to not check the integrity information.

20. The system of claim 13, wherein the integrity module is further configured to remove the additional integrity information prior to sending the data to one of the source or a host.

21. A computer program product embodied on a computer readable storage medium comprising a program of machine-readable instructions that, when executed, causes a computer to:

monitor data received from a source, the data comprising integrity information;

verify the compatibility of the integrity information with a standard; and wrap additional integrity information to the data received from the source, wherein the additional integrity information comprises a block of data having a Longitudinal Redundancy Check (LRC) portion, a sequence number portion, and a pad portion.

22. The computer program product medium of claim 21, wherein the instructions, when executed, further causes the computer to move the integrity information of the data to a header position, and to attach the additional integrity information to the data.

23. The computer program product of claim 21, wherein the instructions, when executed, farther causes the computer to wrap the data with additional integrity information when the source has required the target to not check the integrity information.

24. The computer program product of claim 21, wherein the instructions, when executed, further causes the computer to remove the additional integrity information prior to sending the data to one of the source or a host.

25. The computer program product of claim 21, wherein the instructions, when executed, farther causes the computer to check integrity information of the data.

26. The computer program product of claim 21, wherein the instructions, when executed, farther causes the computer to maintain a plurality of data blocks and check the integrity information of the data blocks.

27. A method for enforcing mandatory end to end integrity checking in a data storage system, the method comprising:

monitoring data received from a source, the data comprising integrity information;

verifying the compatibility of the integrity information with a standard; and wrapping additional integrity information to the data received from the source, wherein the additional integrity information comprises a block of data having a Longitudinal Redundancy Check (LRC) portion, a sequence number portion, and a pad portion.

28. The method of claim 27, wherein the method comprises moving the integrity information of the data to a header position, and attaching the additional integrity information to the data.

29. The method of claim 27, wherein the method comprises wrapping the data with additional integrity information when the source has required the target to not check the integrity information.

30. The method of claim 27, wherein the method comprises removing the additional integrity information prior to sending the data to one of the source or a host.

* * * * *